July 9, 1963
J. R. ELLETT
3,097,276
PRESSURE RESPONSIVE DEVICE
Filed April 24, 1961
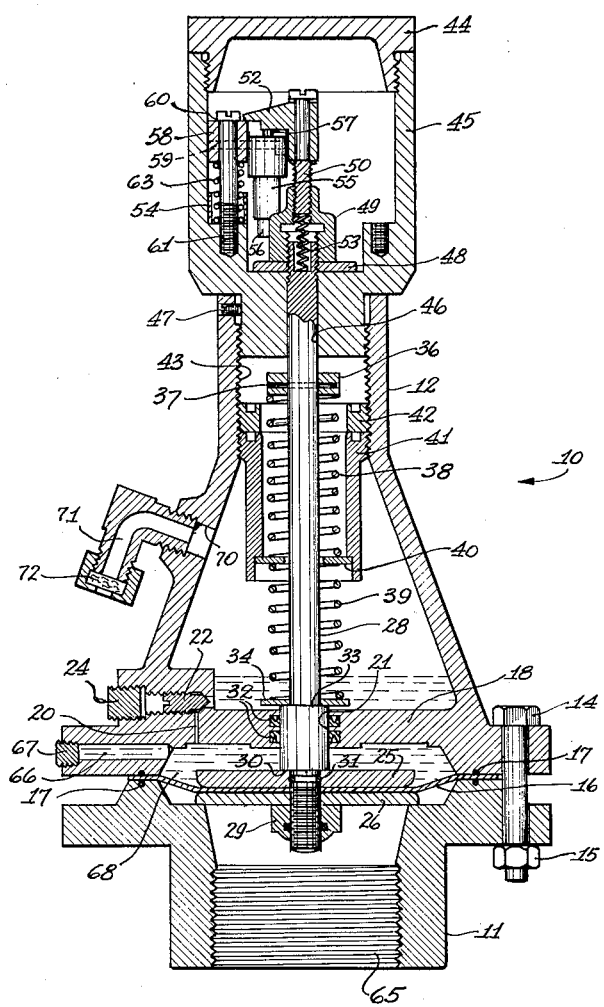
INVENTOR
James R. Ellett
BY Harold A. Weir
ATTORNEY

United States Patent Office 3,097,276
Patented July 9, 1963

3,097,276
PRESSURE RESPONSIVE DEVICE
James R. Ellett, Edmonton, Alberta, Canada, assignor to Barber Machinery Limited, South Edmonton, Alberta, Canada
Filed Apr. 24, 1961, Ser. No. 104,863
3 Claims. (Cl. 200—83)

This invention relates to improvements in pressure responsive devices, and in particular it relates to improved pressure responsive devices useful in controlling the level of a liquid.

It is frequently desirable to be able to control the level of a liquid in a tank or container, that is to keep the level within predetermined limits. For example, in manufacturing processes where liquids are involved, and in the storing of liquids in tanks, it is often desirable to control the level of the liquid. In the past different devices have been proposed that are responsive to liquid level to initiate operation of external apparatus such as a valve or pump to control liquid level. One of the types of device used in the past for liquid level control is a pressure responsive device, that is a device responsive to the pressure created by the hydrostatic head of the liquid whose level is to be controlled.

One such prior art pressure responsive device is mounted near the bottom of a container and comprises a diaphragm actuated by the hydrostatic head of the liquid in the container and an electric switch operated by mechanical movement of the diaphragm. The diaphragm has a spring which biases it against the pressure of the liquid, and changes in the amount of spring bias will adjust the device for actuation at different pressures of liquid on the diaphragm. The electric switch may be used to initiate or terminate operation of a valve or pump to control the level of the liquid in the container.

This prior art device has several disadvantages. One disadvantage is that it operates with positive pressures only. That is, if a process requires that the level of a liquid be controlled in a container where the pressure is less than atmospheric pressure, or where the range of operation lies both above and below atmospheric pressure, the prior art device cannot be used. Further, there is no provision for varying both the range of operation of the device and the specific actuation pressures within that range. Another disadvantage is that the prior art device is sensitive to surges or pressure peaks. There is no provision for damping the pulses created by pressure surges.

Other devices are also available, but in general they suffer from having a restricted degree and range of operating conditions under which they will operate satisfactorily.

The present invention seeks to overcome the disadvantages of the prior art devices by providing a pressure responsive device for controlling an electric current where the range of operation is adjustable both above and below atmospheric pressure, where the specific actuation pressures within the range are adjustable, and where a variable degree of damping of pressure surges is available.

It is therefore an object of this invention to provide an improved pressure responsive device having a variable degree of damping.

It is another object of this invention to provide an improved pressure responsive device having means to vary the range of operation pressures to which the device is responsive and to vary the specific points of operation within this range.

It is yet another object of this invention to provide a pressure responsive device useful in controlling the level of a liquid in a system where the device is capable of being responsive to pressures both above and below atmospheric pressure.

Further objects and advantages of this invention will appear from the following description taken in conjunction with the accompanying drawing in which the single FIGURE is a sectional side elevation of a pressure responsive device according to the invention.

Briefly, the invention comprises a casing with a diaphragm extending across it and sealed to the casing at its periphery. An inlet opening in the casing admits liquid to a first chamber on one side of said diaphragm. A spindle is mounted within said casing and movable longitudinally by flexing movement of said diaphragm. A first and second spring exert opposing forces on said spindle from a member adjustably mounted to the casing whereby movement of said member varies the distribution of said opposing forces to vary the operating range of pressures on said diaphragm which cause movement of said spindle within predetermined limits. An electric switch is mounted on the casing and adapted to be operated by longitudinal movement of the spindle past a predetermined point. Means are provided to vary the position of the switch to alter the predetermined point at which the switch operates.

Referring now to the single FIGURE, a casing 10 has a lower portion 11 and an upper portion 12 joined tightly together by any convenient means such as bolts 14 and nuts 15. A diaphragm 16 extends across the casing 10 and is clamped at its periphery between the lower casing 11 and upper casing 12. Annular grooves 17 in the facing parts of casing portions 11 and 12 effect a positive seal between the casing and the diaphragm.

The upper portion 12 of casing 10 has a wall 18 towards its lower end which is provided with a passageway 20 and an opening 21. A throttling screw 22 is mounted in a threaded opening through the wall of casing portion 12 and projects into passageway 20. The throttling screw 22 thus constitutes a valve which can be screwed farther in or out of passageway 20 to alter the effective size of the passageway. A pipe plug 24 may be used to close and seal the opening in the casing which contains screw 22.

The diaphragm 16 has upper and lower diaphragm plates 25 and 26 respectively, and the diaphragm 16 with the two plates 25 and 26 comprise a diaphragm assembly. A hole is provided extending through the diaphragm assembly to receive one end of a spindle 28. The end of spindle 28 is threaded and an elastic stop nut 29 holds the diaphragm assembly firmly against shoulder 30 on spindle 28. An O ring type seal 31 on spindle 28 provides a liquid tight seal between the spindle and the diaphragm assembly.

The spindle 28 extends through opening 21 and is slidably movable therein. Seals 32 in wall 18 substantially prevent liquid flow through opening 21 past spindle 28. A shoulder 33 on spindle 28 carries a spring base plate 34, and a collar 36 is mounted on spindle 28 by pin 37. A top spring 38 and a bottom spring 39 are separated by a washer or disc 40 and are lightly compressed between base plate 34 and collar 36. The disc 40 is held in an adjustable sleeve 41 which is threaded on the outer surface at one end to engage a threaded portion 43 on the inner wall of upper part 12 of casing 10. Rotation of sleeve 41 will raise or lower it and a jam nut 42 is provided to lock sleeve 41 in a selected position.

Also threadedly engaging the threaded portion 43 of upper casing 12 is a switch housing 45. The switch housing is closed at the end by a cover plate 44 and is held in position against unwanted rotation by a set screw 47. Opening 46 in switch housing 45 accommodates spindle 28 which extends slidably therethrough. Seals may be provided in opening 46 similar to seals 32 in opening 21 to prevent liquids getting into the switch housing 45. The end of spindle 28 projecting into switch housing 45 is threaded. A trip plate locknut 48 and a nut 49 are screwed onto the end of spindle 28 and locked in position. The nut 49 is threaded at the end remote from the spindle to receive an adjusting screw 50 which has a reset tripper arm 52 fixed to its upper end. A friction spring 53 has one end set in a depression in spindle 28 and the other end bears against adjusting screw 50 to keep the engaging threads of screw 50 and nut 49 in positive engagement to resist wobble and prevent turning that might occur because of vibration.

An electric switch 55, for example, a microswitch, is adjustably mounted within switch housing 45. The switch 55 has an operating member 56 and a reset member 57. The switch 55 is fastened to a mounting 58 by suitable means such as screw 59. An adjusting screw 60 extends through mounting 58 and into a threaded hole 61 in the switch housnig 45. A spring 63 is held in compression between the mounting 58 and the switch housing 45. The spring 63 urges the mounting 58 against the head of adjusting screw 60 to resist any turning of scraw 60 that might result from undue vibration. A stop collar 54 is positioned around adjusting screw 60 to prevent the mounting 58 from being lowered to a point where the operating member 56 cannot absorb the maximum travel of the trip plate locknut 48 as it moves with spindle 28.

It will be apparent that longitudinal movement of spindle 28 upwards will bring the tripper plate 48 against the operating member 56 of switch 55 to operate the switch. The point at which the switch 55 operates can be varied by adjusting screw 60. Once the switch has been operated, a downward movement of spindle 28 will bring the reset tripper arm 52 against the reset member 57 of switch 55 to reset the switch. The point at which switch 55 resets is varied by movement of both adjusting screws 50 and 60. However, once the adjusting screw 60 has been set to cause operation of switch 55 to a first condition, at a desired position of spindle 28, the adjusting screw 50 can be set to cause the operation of switch 55 to a second condition (a reset condition) at a desired position of spindle 28. Longitudinal movement of the spindle 28 is in response to pressure changes on diaphragm 16 as will subsequently be described in more detail.

In order that pressure surges on diaphragm 16 may be prevented from oscillating spindle 28, a damping means is included. An opening 66 is provided in casing portion 12 to permit a damping liquid 68 to be admitted into the chamber defined by the walls of casing portion 12, wall 18, and diaphragm 16. The amount of damping liquid 68 introduced should be sufficient to fill the chamber and passageway 20 and to cover the exit opening of passageway 20 above wall 18. The opening 66 is threaded to receive a pipe plug 67 to seal the opening. As is well known, the restricted size of the opening of passageway 20 will have a damping effect on any oscillations that occur in the diaphragm assembly and spindle 28 as a result of pressure surges. The seals 32 prevent leakage through opening 20 and thus provide a maximum damping effect. The degree of damping may be adjusted for varying circumstances by advancing or retarding the throttling screw 22 to alter the effective opening of passageway 20. The damping liquid 68 should have a viscosity index that will minimize the effect of temperature changes on the degree of damping.

The casing portion 12 is provided with an opening 70 which acts as a breather to maintain atmospheric pressure within casing portion 12 above wall 18. Thus there is no changing pressure conditions in the casing portion 12 above wall 18 to affect the flow of damping liquid 68. The opening 70 may have an elbow 71 and a filter 72 to prevent foreign material from entering the casing.

A threaded opening 65 is provided at the bottom of lower casing portion 11 to connect the device to a liquid container holding a liquid whose level is to be controlled. The connection to the container must be below the lowest liquid level to which the device is to be responsive and is conveniently towards the bottom of the container.

In the operation of the device, the connection is made to a container whose liquid level is to be controlled and the hydrostatic head of the liquid above the connection creates a pressure in the chamber below diaphragm 16. This causes diaphragm 16 to flex until it reaches a point of balance amongst the various forces on it. The large area of the diaphragm 16 makes it sensitive to pressure changes. An increase in the level of the liquid in the container will increase the hydrostatic head which will increase the pressure below the diaphragm moving the diaphragm 16 and spindle 28 upwards. Conversely, a decrease in liquid level in the container will decrease the hydrostatic head and cause spindle 28 to move downwards. The amount of movement of spindle 28 is limited in the upward direction by the upper diaphragm plate 25 contacting the bottom of wall 18, and in the downward direction by trip plate locknut 48 contacting the switch housing 45. The spindle 28 may move freely up and down between these limits in response to pressure changes below the diaphragm.

In order to adjust the device to maintain the liquid level in the container between desired limits, the pressures on the diaphragm which correspond to their liquid level limits should be known. It will be recalled that adjustable sleeve 41 can be moved upwards or downwards within casing 10 and that it carries disc 40 with it. Movement of sleeve 41 will alter the distribution of the forces exerted on spindle 28 by springs 38 and 39. Consequently, the range of pressures exerting a force on diaphragm 16 which cause movement of spindle 28 from one limit to the other can be varied. In fact, this range of pressures can be varied smoothly from above atmospheric pressure to below atmospheric pressure. Therefore, the position of sleeve 41 is set so that the range of pressures to which the diaphragm is responsive to move spindle 28 between its limits will include the pressures corresponding to the two desired limits of liquid level. The adjusting screw 60 is then varied so that the switch 55 operates to a first condition when spindle 28 moves upwards to a position corresponding to the upper desired limit of the liquid level. The screw 50 is then varied so that the switch 55 operates to a second or reset condition when spindle 28 moves downwards to a position corresponding to the lower desired limit of liquid level. By connecting switch 55 to suitable electric apparatus the level of liquid in the container may be kept within the desired limits. For example, the switch 55 might be connected in a power circuit supplying an electric motor which drives a pump to add liquid to the container. Under these circumstances, the first condition of the switch 55 would be an open condition where the pump was turned off. When the liquid level fell to the lower limit the switch would operate to its second condition which would be closed to energize the motor and cause the pump to add liquid to the container.

Another microswitch may be placed in switch housing 45 to serve as a high level safety shut off or to energize warning lights on a control panel.

It will be seen that the pressure responsive device of this invention can be used to maintain the level of liquid in a container between desired limits.

Other embodiments and variations will appear to those skilled in the art, and it is intended to include all such other embodiments and variations as fall within the true scope of the invention in the appended claims.

I claim:

1. A pressure responsive device comprising a casing, a wall dividing said casing into first and second compartments, said wall being provided with a passageway and an opening connecting said first and second compartments, a valve for varying the effective size of said passageway, a diaphragm extending across said first compartment spaced from said wall and dividing said first compartment into first and second chambers, said first chamber lying between said wall and said diaphragm, damping liquid filling said first chamber and said passageway, said second chamber being provided with an opening communicating with said second chamber to admit to said second chamber a pressure applying fluid to cause flexing of said diaphragm, a spindle mounted in said casing and extending slidably through said opening in said wall, said spindle being fastened to said diaphragm and longitudinally movable by flexing of said diaphragm, first and second collars fixed to said spindle in said second compartment and spaced one from the other, a member in said second compartment having an adjustable mounting to said casing positioning said member adjacent said spindle between said collars, a first and a second spring in said second compartment positioned with one end of each said spring bearing on said member, said springs extending in opposite directions from said member with the other ends of said first and second springs bearing on said first and second collars respectively to exert opposing forces on said spindle from said member, said adjustable mounting of said member providing longitudinal movement thereof to vary the forces exerted by both said first and second springs on said spindle and thereby vary the range of pressures on said diaphragm causing movement of said spindle between predetermined limits of movement, an electric switch adjustably mounted on said casing and operable by longitudinal movement of said spindle past a predetermined point, and means to vary the position of said switch to alter said predetermined point.

2. A pressure responsive device comprising a casing, a wall dividing said casing into first and second compartments, said wall being provided with a passageway and an opening connecting said first and second compartments, a valve for varying the effective size of said passageway, a diaphragm extending across said first compartment spaced from said wall and dividing said first compartment into first and second chambers, said first chamber lying between said wall and said diaphragm, said casing being provided with a first opening leading into said first chamber for filling said first chamber with a damping liquid, a plug for closing said first opening, said casing being provided with a second opening communicating with said second chamber to admit to said second chamber a pressure applying fluid to cause flexing of said diaphragm, a spindle mounted in said casing and extending slidably through said opening in said wall, a seal to prevent substantially the passage of said damping liquid through said opening in said wall past said spindle, said spindle being fastened to said diaphragm and longitudinally movable by flexing of said diaphragm, first and second collars around said spindle in said second compartment, fastening means to fasten said collars to said spindle in spaced relation to one another to prevent longitudinal movement of said collars with respect to said spindle, a member in said second compartment having an adjustable mounting to said casing positioning said member adjacent said spindle between said collars, a first and a second spring in said second compartment, one end of said first spring bearing on a side of said member towards said first collar and the other end of said first spring bearing against said first collar, one end of said second spring bearing on a side of said member towards said second collar and the other end of said second spring bearing against said second collar, said first and second springs exerting opposing forces on said spindle, said adjustable mounting of said member providing longitudinal movement thereof to vary the forces exerted by both said first and second springs on said spindle and thereby vary the range of pressures on said diaphragm causing movement of said spindle between predetermined limits of movement, an electric switch adjustably mounted on said casing and operable by longitudinal movement of said spindle past a predetermined point, and means to vary the position of said switch to alter said predetermined point.

3. A pressure responsive device for controlling an electric current comprising a casing, a horizontal wall dividing said casing into upper and lower compartments, said wall being provided with a small passageway and a centrally located opening connecting said upper and lower compartments, a valve for varying the effective size of the opening in said passageway, a diaphragm mounted horizontally within said lower compartment and dividing said lower compartment into first and second chambers, said first chamber being between said wall and said diaphragm, said casing being provided with a first opening leading into said first chamber for filling said first chamber with a damping liquid, a plug for closing said opening, said casing being provided with a second opening communicating with said second chamber to admit to said second chamber a pressure applying fluid to cause flexing of said diaphragm, a spindle mounted in said casing and extending slidably through said centrally located opening in said wall, a seal to prevent substantially the passage of liquids through said centrally located opening past said spindle, said spindle being fastened to said diaphragm and longitudinally movable by a flexing of the diaphragm, first and second collars around said spindle in said upper compartment, fastening means to fasten said collars to said spindle in spaced relation to one another to prevent longitudinal movement of said collars with respect to said spindle, a member in said upper compartment threadedly engaging said casing, rotation of said member causing longitudinal movement thereof within said casing, a disc supported by said member adjacent said spindle between said collars, a first and second spring in said upper compartment, one end of said first spring bearing on a side of said disc towards said first collar and the other end of said first spring bearing against said first collar, one end of said second spring bearing on the opposite side of said disc towards said second collar and the other end of said second spring bearing against said second collar, said first and second springs exerting opposing forces on said spindle from said supported disc, longitudinal movement of said member and said supported disc varying the forces exerted by both said first and second springs on said spindle to thereby alter the operating range of pressures on said diaphragm causing movement of said spindle between predetermined limits of movement, said casing being provided with a third opening leading into said upper compartment to maintain it substantially at atmospheric pressure and a fourth opening leading into said upper compartment to accommodate said spindle, an electric switch having an operating member and a reset member, said switch being adjustably mounted to said casing externally of said casing adjacent said fourth opening, a trip plate carried by said spindle externally of said casing to engage said operating member of said switch and cause said switch to operate to a first condition by longitudinal movement of said spindle in a first direction past a first predetermined point, means to vary the position of said switch longitudinally to alter said first predetermined point, a reset tripper arm adjustably mounted on said spindle to engage said reset member of said switch and cause said switch to operate to a second condition by longitudinal movement of said spindle in a second direction past a second predetermined point, and means to vary the position of the reset tripper arm longitudinally with respect to said spindle to alter said second predetermined point.

References Cited in the file of this patent
UNITED STATES PATENTS

| | | |
|---|---|---|
| 1,214,978 | Veley | Feb. 6, 1917 |
| 1,781,289 | Mayo | Nov. 11, 1930 |
| 2,985,732 | Russell | May 23, 1961 |